United States Patent [19]

Jacobson

[11] 3,909,537

[45] Sept. 30, 1975

[54] TELEPHONE ANSWERING APPARATUS

[76] Inventor: Sava Jacobson, 8130 Orion St., Van Nuys, Calif. 91406

[22] Filed: Aug. 21, 1973

[21] Appl. No.: 390,315

[52] U.S. Cl. .................. 179/6 R; 242/57; 116/114 J

[51] Int. Cl. ............................................. H04m 1/64

[58] Field of Search .................. 179/6 R, 6 AC, 6 E; 242/57; 15/210; 116/114 R, 114 J

[56] References Cited

UNITED STATES PATENTS

| | | | |
|---|---|---|---|
| 2,063,323 | 12/1936 | Mallina | 179/6 R |
| 2,519,318 | 8/1950 | Kuhlik | 179/6 R |
| 3,069,815 | 12/1962 | Valentine | 15/210 |
| 3,167,264 | 1/1965 | Ohtsu | 242/57 |
| 3,344,234 | 9/1967 | Salzberg et al. | 179/6 R |
| 3,445,600 | 5/1969 | Todd | 179/6 R |
| 3,480,731 | 11/1969 | Boggild | 179/6 E |
| 3,485,952 | 12/1969 | Walker | 179/6 R |
| 3,590,160 | 6/1971 | Meri | 179/6 R |
| 3,603,523 | 9/1971 | Umeda et al. | 242/57 |
| 3,630,170 | 12/1971 | Christo | 360/137 |
| 3,643,895 | 2/1972 | Atsumi | 242/57 |
| 3,690,589 | 9/1972 | Bonjyo et al. | 242/57 |
| 3,706,424 | 12/1972 | Toensing | 242/57 |
| 3,728,489 | 5/1972 | Beacham | 179/6 R |
| 3,780,226 | 12/1973 | Jacobson | 179/6 R |
| 3,801,744 | 4/1974 | Hayashi | 179/6 R |
| 3,825,699 | 7/1974 | Danner | 179/6 R |

*Primary Examiner*—Bernard Konick
*Assistant Examiner*—David K. Moore
*Attorney, Agent, or Firm*—Howard A. Silber

[57] ABSTRACT

In a telephone answering device, the number of received calls is indicated by a number ring rotated in geared relationship with the rim-driven, incoming message tape take up reel. A fixed length incoming message period is established by actuating an answering cycle termination switch after a single revolution of a gear member driven by the take up reel. The same gear member rotates the number ring by a fixed angular extent each time an incoming message is recorded. Numerals, provided on the number ring with like angular separation, indicate the number of answered calls.

Other disclosed improvements include a control circuit actuated only by a ringing signal and not by high dc surges which may occur on the telephone line; utilization of a flip-flop to switich power to the outgoing announcement loop and incoming tape drive motors; a very simple message-received indicator; the use of an abrasive strip to clean the record/playback head associated with the announcement tape loop; and "fail-safe" switching means for deactuating the answering device when no more tape remains for recording additional incoming messages or when the announcement tape loop has failed.

18 Claims, 7 Drawing Figures

TELEPHONE ANSWERING APPARATUS

BACKGROUND OF THE INVENTION

Related Applications

The present invention is related to the inventor's co-pending U.S. patent applications entitled TELEPHONE ANSWERING APPARATUS (Ser. No. 195,400), now U.S. Pat. No. 3,780,226, and CONTROL CIRCUIT FOR TELEPHONE ANSWERING DEVICE (Ser. No. 254,924), now U.S. Pat. No. 3,818,141.

Field of the Invention

The present invention relates to improvements in telephone answering devices, and specifically to received message indicators, incoming message timing means, and control circuits for such devices.

Description of the Prior Art

In a telephone answering device, it is desirable to provide some visual indication that one or more calls have been answered. The prior art approaches include utilization of a solenoid-actuated counter energized by the telephone ring detector circuit, for the use of a conventional revolution counter geared to the incoming message recording mechanism. Such approaches are complex, and hence not suitable for very low cost telephone answering devices. An object of the present invention is to provide very simple means for indicating that messages have been received.

Provision must be made to detect a ringing signal; to enable recording of an incoming message after transmission of an answer announcement; and to terminate the answering cycle. Preferably, means also should be provided to inhibit operation of the answering device when the supply of incoming message recording tape is exhausted. In the past, separate, often complex arrangements were used to accomplish these functions. Another object of the present invention is to provide a simplified, low cost implementation of these functions, in part by utilizing the same components to perform plural operations. Thus a specific objective is to provide a single mechanism for indicating the number of received calls, for timing the incoming message cycle, and for inhibiting operation when no more tape is available to record incoming messages. The mechanism cooperates with an improved circuit which detects the telephone ringing signal and which actuates the tape drive motors in appropriate sequence.

SUMMARY OF THE INVENTION

These and other objectives are achieved by providing a telephone answering device having a simplified mechanism for timing the incoming message record portion of the answering cycle and for indicating the number of received calls. The incoming message tape take up reel is rim-driven, so that it will make a constant number of rotations within the fixed time period allocated to record each incoming message. Geared to the take up reel is a switch-actuating member which makes a single revolution during the incoming message record period. Upon completion of this single revolution, the member actuates a switch which terminates the answering cycle.

A number ring, preferably mounted coaxially with the take up reel, is gear-driven by the termination-switch actuating member. Imprinted on the number ring, with fixed angular separation, is a sequence of numerals for indicating the number of received messages. The number ring drive gear ratio is selected so that for each revolution of the termination-switch actuating member, the number ring will be rotated through an angular extent equal to the separation between the imprinted numerals. Thus the numeral appearing through a fixed window will indicate the number of calls which have been received. The number ring will be reset to zero each time the incoming message tape is rewound. A fail-safe switch, actuated by a tab extending from the number ring, inhibits operation of the answering device when no more tape is available to record incoming messages.

In an alternative, very low cost embodiment, a visual display indicates that at least one message has been received. The display consists of a colored area provided on the cover of the supply reel for the incoming message record tape. The cover is mounted for limited rotation. When the tape is rewound, friction between the supply reel hub and the cover rotates the cover to a position in which the colored indicator patch is hidden from view. When the first call is answered, the supply reel hub rotates the cover in the opposite direction to a position in which the colored patch is evident through a window in the device housing. This provides a visual indication to the user that at least one message has been answered.

In an improved control circuit, the answering device is turned on by a silicon controlled rectifier, triggered upon occurrence of a telephone ringing signal. The telephone line input circuit is transformer-isolated from the gate of the SCR and configured to respond only to occurrence of a ringing signal. The circuit is not responsive to high dc surges which may occur on the telephone line.

Another feature of the device is the use of a power flip-flop which controls power to the separate motors driving the announcement tape loop and the incoming message recording tape. The flip-flop performs the mid-answering-cycle mode switching operation, and appropriately energizes the motors without the need for relays or other switches.

BRIEF DESCRIPTION OF THE DRAWINGS

A detailed description of the invention will be made with reference to the accompanying drawings, wherein like numerals designate corresponding elements in the several figures.

DESCRIPTION OF THE PREFERRED EMBODIMENTS

The following detailed description is of the best presently contemplated modes of carrying out the invention. This description is not to be taken in a limiting sense, but is made merely for the purpose of illustrating the general principles of the invention since the scope of the invention best is defined by the appended claims.

Figure 1:
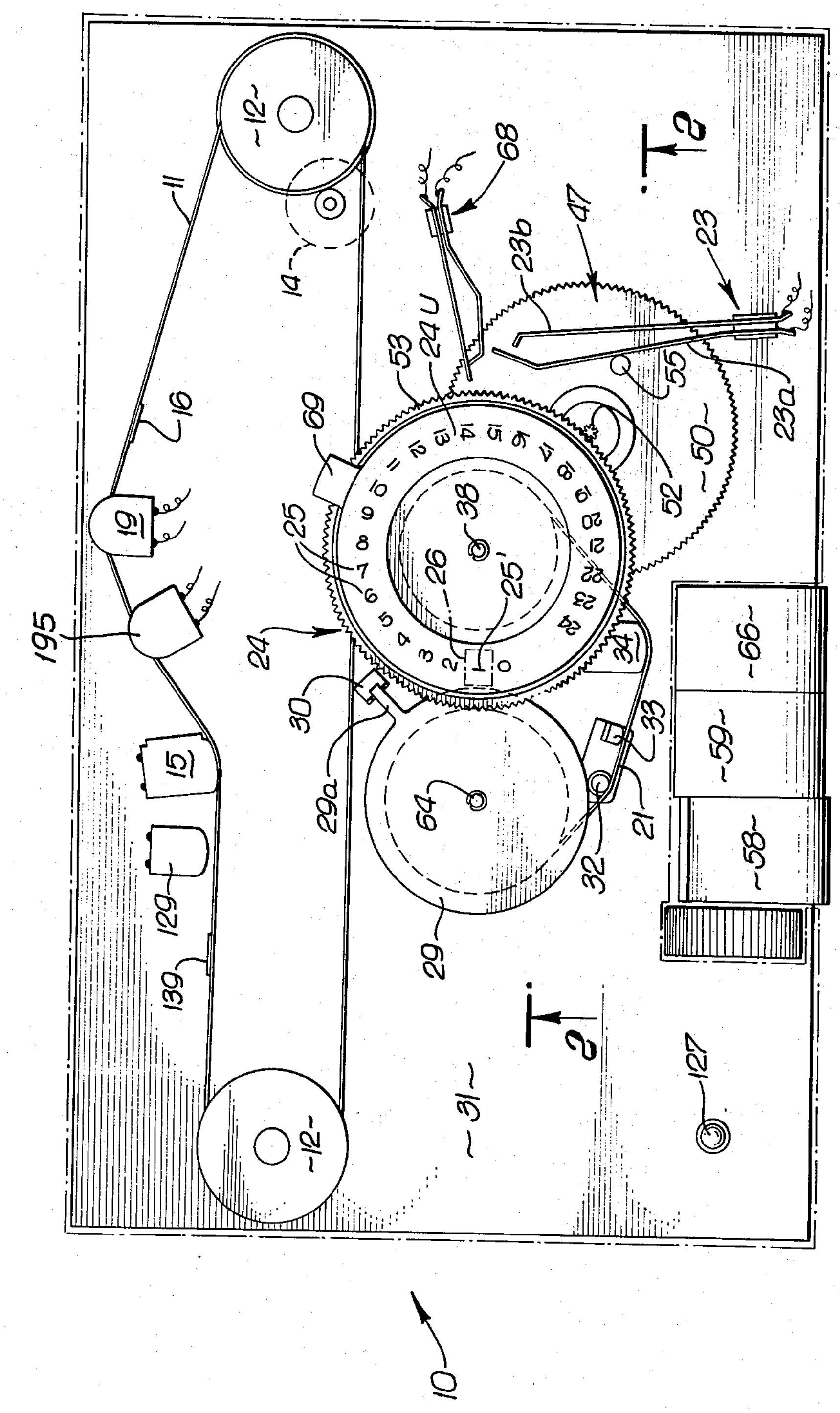
FIG. 1 is a top view of a telephone answering device incorporating the inventive call counter and incoming message timing mechanism.
Figure 2:
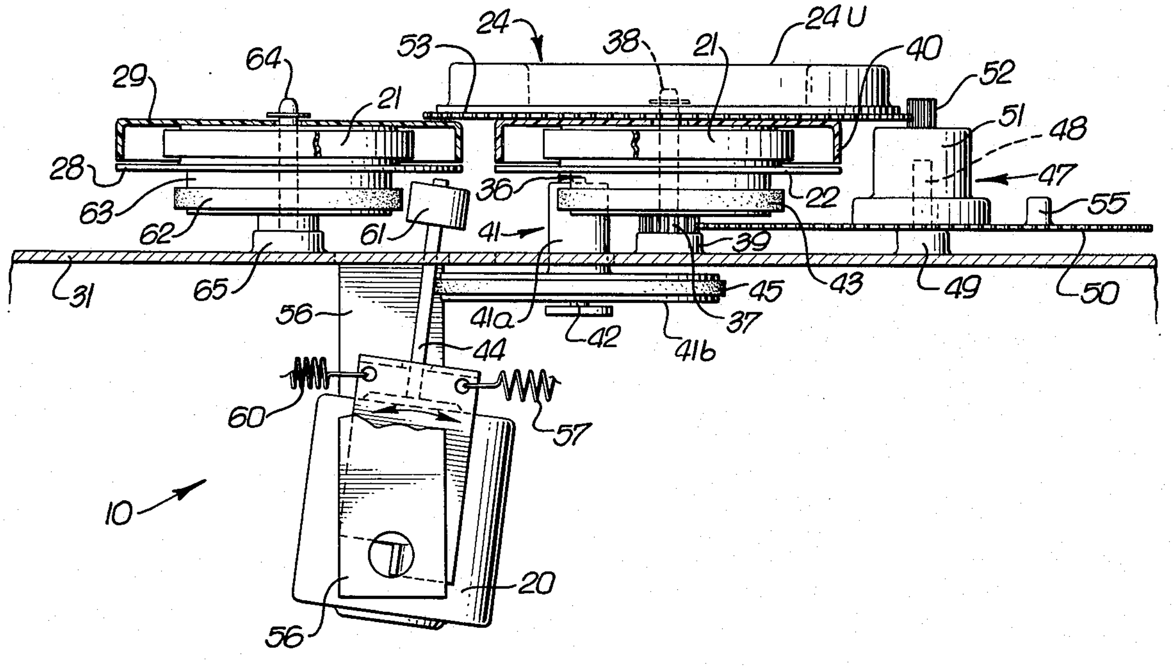
FIG. 2 is a transverse sectional view of the apparatus of FIG. 1, as viewed along the line 2—2 thereof.

In the telephone answering device of 10 of FIGS. 1 and 2, the outgoing announcement is prerecorded on an endless tape loop 11 supported by a pair of pulleys 12. When the telephone rings, the electrical circuit 13 of FIG. 3 energizes a motor 14 which drives the tape loop 11. The outgoing announcement is picked up from the loop 11 by a record/play back head 15 for amplification and transmission to the telephone line in a conventional manner.

After one revolution of the tape loop 11, during which the outgoing message is transmitted, an electrically conductive segment 16 on the loop 11 shorts a pair of contacts 17, 18 mounted on a contact post 19. As described below in connection with FIG. 3, this causes the motor 14 to be turned off, thereby terminating the outgoing message transmit portion of the answering cycle. Shorting of the contacts 17, 18 also causes energization of a separate motor 20 which drives the tape 21 on which incoming messages are recorded. A rim-drive arrangement is used so that the incoming message tape take up reel 22 is rotated at a constant rate. A gearing arrangement, described below, is used to close a switch 23 after the take up reel 22 has completed a fixed number of rotations. In cooperation with the circuit 13, closure of the switch 23 turns off the motor 20 and releases the telephone line to terminate the answering cycle.

A number ring 24 indicates the number of incoming messages which have been recorded on the tape 21. To this end, a sequence of numerals 25 (typically the numbers 0 through 24) are imprinted at fixed angular intervals on the upper surface 24u of the number ring 24. A gearing system, described below, causes the number ring 24 to rotate through a like fixed angular extent as each incoming message is recorded. Thus the numeral 25′ visible through a window 26 (shown in phantom in FIG. 1) indicates the number of incoming calls which have been answered by the device 10 since the message tape 21 last was rewound.

The incoming message tape 21 is supplied from a reel 28 provided with a cover 29 which prevents tape spillage. The cover 29 is held stationary by a unitary arm 29*a* received by a bracket 30 mounted to the chassis 31 of the device 10. The tape 21 travels past a tape guide 32, an erase head or magnet 33 and a record/play back head 34 prior to being wound on the take up reel 22.

As shown in FIG. 2, the take up reel 22 is seated on, and rotates in unison with a pan 36 having an integrally formed, concentric gear 37 extending from its lower surface. The take up reel 22, the pan 36 and the gear 37 all rotate about a stationary shaft 38 extending upwardly from a collar 39 afixed to the chassis 31. The number ring 24 also is rotatably mounted on the shaft 38. An optional lid 40, which may be stationary, covers the take up reel 22 beneath the number ring 24. To drive the take up reel 22, the pan 36 is rim driven by the motor 20 via an intermediate drive member 41 rotatably mounted on a shaft 42. The shaft 42 may be situated at the end of a conventional free-floating idler arm (not shown), which holds the cylindrical portion 41*a* of the drive member 41 against a rubber ring 43 surrounding the periphery of the pan 36. The shaft 44 of the motor 20 engages a rubber ring 45 at the periphery of the lower, relatively large diameter portion 41*b* of the drive member 41. With this arrangement, a relatively high speed motor 20 may be used to rim-drive the take up reel 22 at a constant angular speed commensurate with reasonable recording fidelity. (Note that although the reel 22 rotates at a constant angular rate, the linear motion of the tape 21 past the record/playback head 34 will not be constant, but will depend on the amount of tape already wound on the reel 22.)

The number ring 24 is driven by a unitary gear member 47 (FIG. 2) which is journaled to a stationary shaft 48 extending from a collar 49 afixed to the chassis 31. The member 47 includes a lower, relatively large diameter gear 50, a spacer 51 and an upper, small diameter gear 52. The large gear 50 engages the much smaller gear 37 which rotates in unison with the take up reel 22. The small gear 52 at the top of the member 47 engages a set of gear teeth 53 formed at the periphery of the number ring 24.

In addition to driving the number ring 24, the gear member 47 also causes closure of the switch 23 (FIG. 1) to terminate the answering cycle. To this end, the member 47 is provided with a boss 55 situated so as to force one switch leaf 23*a* into contact with other switch leaf 23*b* once for each revolution of the gear 50.

Since closure of the switch 23 terminates the answering cycle, it is apparent that one revolution of the gear 50 will establish the fixed time duration of the incoming message record portion of the answering cycle. Since the take up reel 22 is rim driven at a constant rotational rate by the motor 20, the fixed time duration allocated for recording the incoming message is established by this reel 22 rotational rate and the diameter ratio of the gears 37 and 50.

The switch 23 will be closed at the beginning of the next answering cycle. However, the control circuit 13 is such that the switch 23 must open before closing to terminate an answering cycle. Therefore, the next answering cycle will not be inhibited even though the switch 23 initially is closed.

The tooth ratio between the gears 52 and 53 is selected so that for each complete rotation of the gear 50, the number ring 24 will rotate through an angular extent equal to the angular spacing between adjacent numerals 25. Thus during each answering cycle, the gear 50 will rotate once, stopping upon closure of the switch 23, and the number ring 24 will rotate sufficiently so that the next numeral 25 will appear in the window 26. In this way, the arrangement of FIGS. 1 and 2 accomplishes both timing of the incoming message record period and counting of the number of answered calls.

During operation of the device 10 in the telephone answering mode, the motor 20 is situated as shown in FIG. 2. The motor 20 is pivotally mounted on a support bracket 56 depending from the chassis 31. A spring 57 biases the motor 20 in a direction such that the shaft 44 is in contact with the drive member 41 and pushes the drive member 41 against the pan 36. The spring 57 may be associated with a mechanical linkage (not shown) actuated when an "answer" push button 58 (FIG. 1) is depressed. To rewind the incoming message tape 21, a "rewind" push button 59 is depressed. This causes the motor 20 to be pivoted counterclockwise (as viewed in FIG. 2) to disengage the shaft 44 from the drive member 41. A spring 60 urges a drive wheel 61 at the end of the shaft 44 into contact with a rubber ring 62 surrounding a pan 63 depending from the tape supply reel 28. The reel 28 and the pan 63 are rotatably mounted on a stationary shaft 64 extending from a collar 65 afixed to the chassis 31. With this arrangement, fast rewind is obtained. Note that during the rewind, the tape 21 will cause counter-rotation of the take up reel 22 and the gear 37. As a result, the gear member 47 and the number ring 24 also will counter-rotate. Accordingly, numerals 25 of decreasing value will appear beneath the window 26. Since there is a one-to-one relationship between the numerals 25 and the messages recorded on the tape 21, the user can stop the rewind operation at any desired message, as indicated by the numeral 25 then situated beneath the window 26. When the tape 21 is completely rewound, the numeral 0 will appear in the window 26.

Subsequent playback is actuated by depressing "playback" push button 66. This again causes the motor 20 to be pivoted to the position shown in FIG. 2, so as to drive the incoming message tape 21 in the forward direction. The record/playback head 34 then is connected in a conventional manner via an amplifier and speaker (not shown) for reproduction of the recorded messages. In this playback mode, the motor 14 is not energized, so that the tape loop 11 remains stationary.

Figure 3:
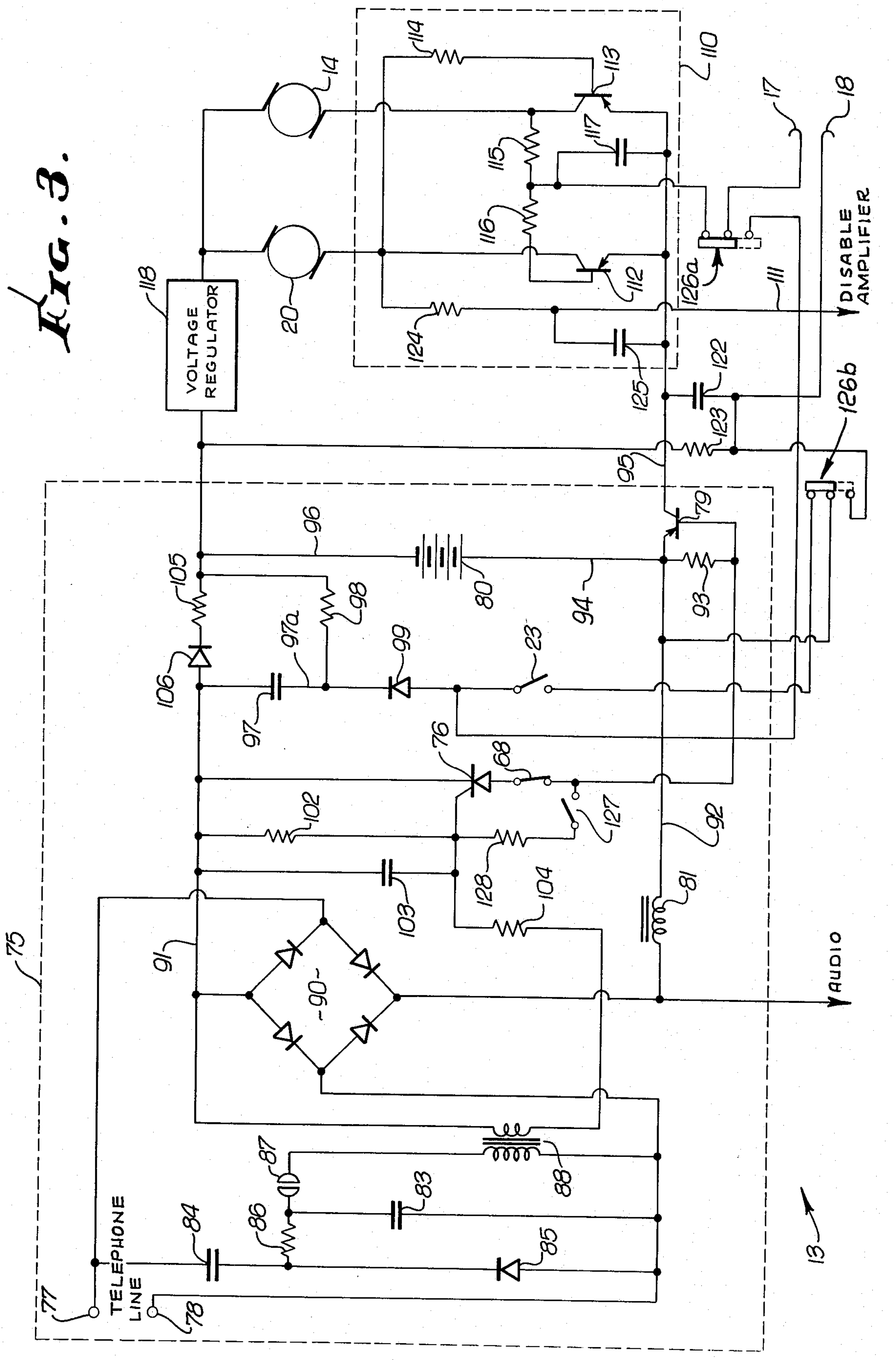
FIG. 3 is an electrical schematic diagram of a control circuit for the answering device of FIG. 1.

Another feature of the mechanism shown in FIG. 1 relates to disabling of the device 10 when no more tape 21 is available to record additional incoming messages. This disabling function is implemented by a normally-closed switch 68 connected as shown in the circuit of FIG. 3. The number ring 24 is provided with a radially extending tab 69. When all of the tape 21 has been wound onto the take up reel 22, the number ring 24 will have rotated to a position in which the tab 69 opens the switch 68. As described below, this deactuates the device 10 so that no additional calls are answered. If the apparatus were not so deactuated, the new message would be lost since there is no more tape 21 available to record that message. Moreover, the device 10 would not be turned off, so that the battery 80 (FIG. 3) would be run down, and the telephone line would be kept "off-hook".

Referring now to FIG. 3, the circuit 13 includes a control portion 75 which is an improved version of that disclosed in the inventor's co-pending U.S. patent application Ser. no. 254,924 entitled CONTROL CIRCUIT FOR TELEPHONE ANSWERING DEVICE. Basically, the circuit 75 includes a silicon control rectifier (SCR) 76 which is triggered into conduction in response to occurrence of a ringing signal on the telephone line which is connected to the terminals 77, 78. Conduction of the SCR 76 turns on a transistor 79 which connects power from a battery 80 to other components of the telephone answering device 10. Conduction of the SCR 76 also seizes the telephone line by providing a loading circuit including the SCR 76, the transistor 79 and an inductor 81.

The SCR 76 is triggered by a pulse which occurs when a capacitor 83 is charged to a sufficient level by the telephone ringing signal. To this end, the ringing signal present across the terminals 77, 78 is supplied via a capacitor 84 to a diode 85 which rectifies the signal. The resultant dc voltage charges the capacitor 83 at a rate determined by a resistor 86. When the charge on the capacitor 83 is sufficiently great, it discharges through a neon bulb 87 and the primary of a transformer 88. The resultant pulse induced in the secondary of the transformer 88 triggers on the SCR 76, thereby initiating a telephone answering cycle.

A bridge rectifier 90 connected across the telephone line terminals 77, 78 defines voltage polarity. The bridge output line 91 always is negative and the output line 92 always is positive, regardless of the telephone line polarity. When the SCR 76 is turned on, a conduction path is completed from the line 91 via the SCR 76, the transistor 79 and the inductor 81 to the line 92. The effect of this loading circuit is to seize the telephone line.

Voltage from the battery 80 is connected to other components of the answering device 10 via the emitter-collector path of the transistor 79. In the stand-by state prior to answering a call, the base of the transistor 79 is held at the same potential as the emitter by a resistor 93. This clamps the transistor 79 off. When the SCR 76 is turned on, the resultant negative voltage supplied from the line 91 to the base of the transistor 79 turns that transistor on. As a result, the positive terminal 94 of the battery 80 is connected via the transistor 79 to a supply line 95.

At the end of the answering cycle, when the switch 23 (FIGS. 1 and 3) is closed, the SCR 76 is turned off. This opens the loading circuit to release the telephone, and terminates conduction of the transistor 79 to disconnect power from other answering device components. Turn off of the SCR 76 is accomplished in the following manner.

During the answering cycle, when the SCR 76 is conducting, there is a potential difference between the line 91 and the negative terminal 96 of the battery 80. As a result, a capacitor 97 is charged via a resistor 98. The polarity at the capacitor terminal 97*a* will be negative with respect to the line 91. Thus, when the switch 23 is closed, the capacitor 97 will discharge (via a diode 99) across the SCR 76. This discharge is of the correct polarity to cause the SCR 76 to turn off.

Appropriate isolation of the transformer 88 is provided to prevent the SCR 76 from being turned on again by ringing of the transformer 88. This isolation is provided by a resistor 102 and a capacitor 103 connected from the gate to the cathode of the SCR 76, and by a resistor 104 connected from the SCR 76 gate to the transformer 88. Through the use of this isolation network, reliable turn off of the SCR 76 is achieved.

It is possible that during the anwering cycle the dc bias on the telephone line may be interrupted, causing premature turn off of the SCR 76. To prevent this, the negative terminal 96 of the battery 80 is connected via a resistor 105 and a diode 106 to the line 91. The value of the resistor 105 is selected to provide sufficient current to hold the SCR 76 in the conducting state should the bias on the telephone line be interrupted. The diode 106 prevents the telephone line from being loaded by the resistor 105 and the battery 80 during the stand-by period. The control circuit 75 of FIG. 3 thus functions to initiate an answering cycle when a telephone ring signal occurs, and terminates the answering cycle when the switch 23 is closed. The circuit 75 responds only to occurrence of a ringing signal, and will not be actuated by intermittent dc pulses which might appear on the telephone line. Indeed, the control circuit 75 has the ability to withstand a 200 volt dc input without going off-hook, and thus meets the presently proposed specifications for line-connected telephone answering devices.

The control circuit 13 includes a flip-flop 110 which controls the operational mode of the answering device 10. When power is first applied by the control circuit 75 at the beginning of an answering cycle, the flip-flop 110 connects power to the motor 14 which drives the announcement loop 11. When the conductive segment 16 (FIG. 1) shorts the contacts 17, 18 at the end of the outgoing announcement, the flip-flop 110 changes state. This disconnects the motor 14 and applies power to the motor 20 which drives the incoming message tape 21. In addition, a disabling signal is provided on a line 111 to disable the amplifier (not shown) used to amplify the outgoing message.

The flip-flip 110 includes a pair of transistors 112, 113 interconnected by three resistors 114, 115, 116. When power first is connected at the beginning of the answering cycle, a capacitor 117 delays base current to the transistor 112. This insures that the transistor 113 will go on. Conduction of the transistor 113 completes a path from the negative battery terminal 96 via a voltage regulator 118, the motor 14 and the transistor 113 to the positive buss 95. During outgoing message transmission, a capacitor 122 is charged via a resistor 123. When the conductive segment 16 on the loop 11 shorts the contacts 17, 18, the charged capacitor 122 is connected via the resistor 116 to the base of the transistor 112 causing the flip-flop 110 to change state. That is, the transistor 113 goes off, turning off the motor 14, and the transistor 112 conducts to supply power to the motor 20. The transistor 112 also provides an amplifier disable signal to the line 111 via a resistor 124 and a bypass capacitor 125.

When a new outgoing message is recorded on the tape loop 11, it is desirable to terminate operation of the device 10 when the conductive segment 16 shorts out the contacts 17, 18. To this end, a ganged switch 126*a*, 126*b* is provided. When the switch 126*a*, 126*b* is set to the position shown in phantom in FIG. 3, the contact 17 is connected to the junction of the diode 99 and the switch 23, and the capacitor 122 effectively is shorted out. Thus when the conductive segment 16 shorts the contacts 17, 18 the capacitor 97 will be discharged across the SCR 76 to turn off that SCR. This will terminate operation of the apparatus 10 after a new outgoing message has been recorded on the loop 11.

Further to facilitate recording of a new announcement message, provision is made for manually triggering the SCR 76 to start rotation of the loop 11. To this end, the circuit 13 (FIG. 3) includes a normally open, push-button switch 127 connected in series with a resistor 128 between the gate and anode of the SCR 76. When the switch 127 is closed, the SCR 76 will go into conduction, providing power via the flip-flop 110 to the tape loop drive motor 14. The old message may be erased using a conventional erase head 129 moved into contact with the loop 11 during recording of the new message.

Figure 4:
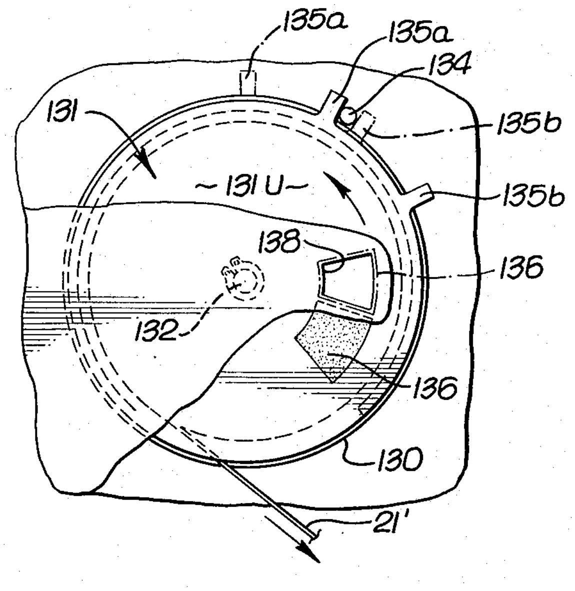
FIGS. 4 and 5, respectively, are top and transverse sectional views of an alternative "message received" indicator.
Figure 5:
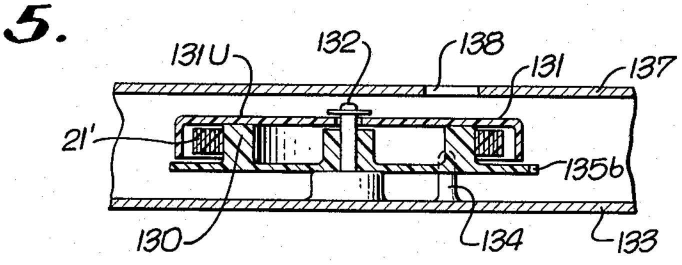

FIGS. 4 and 5 show a very simple, inexpensive means for indicating that at least one message has been received by a telephone answering device. The supply reel hub 130 for the incoming message tape 21' is provided with a stationary cover 131. The reel hub 130 and the cover 131 both are rotatably mounted on a stationary shaft 132 extending from the chassis 133 of the answering device.

Rotation of the cover 131 is limited by a restraining post 134 extending from the chassis 133 and situated between a pair of tabs 135*a*, 135*b* extending radially from the cover 131 and formed integrally therewith. A colored indicator area 136 is provided on the upper surface 131U of the cover 131.

When the tape 21' is rewound, friction between the reel hub 130 and the cover 131 causes clockwise rotation of the cover 131 (FIG. 4) to the position in which the tab 135*a* abuts against the restraining post 134. In this orientation, the colored indicator 136 is hidden beneath the upper cover 137 of the answering device.

As the first incoming message is recorded, tape 21' will be unwound from the reel hub 130. This will cause counterclockwise rotation of the cover 131 to the position (shown in phantom in FIG. 4) in which the tab 135*b* abuts against the restraining post 134. In this orientation, the colored indicator area 136 is situated beneath a transparent window 138 in the cover 137 of the answering device. Thus the presence of the colored area 136 beneath the window 138 indicates to the user that at least one telephone call has been answered since the tape 21' last was rewound.

A slight abrasive segment 139 may be provided on the tape loop 11 to clean the record/playback head 15 each time an announcement is transmitted. A similar abrasive segment may be used on the tape 21 to clean the head 34.

Figure 6:
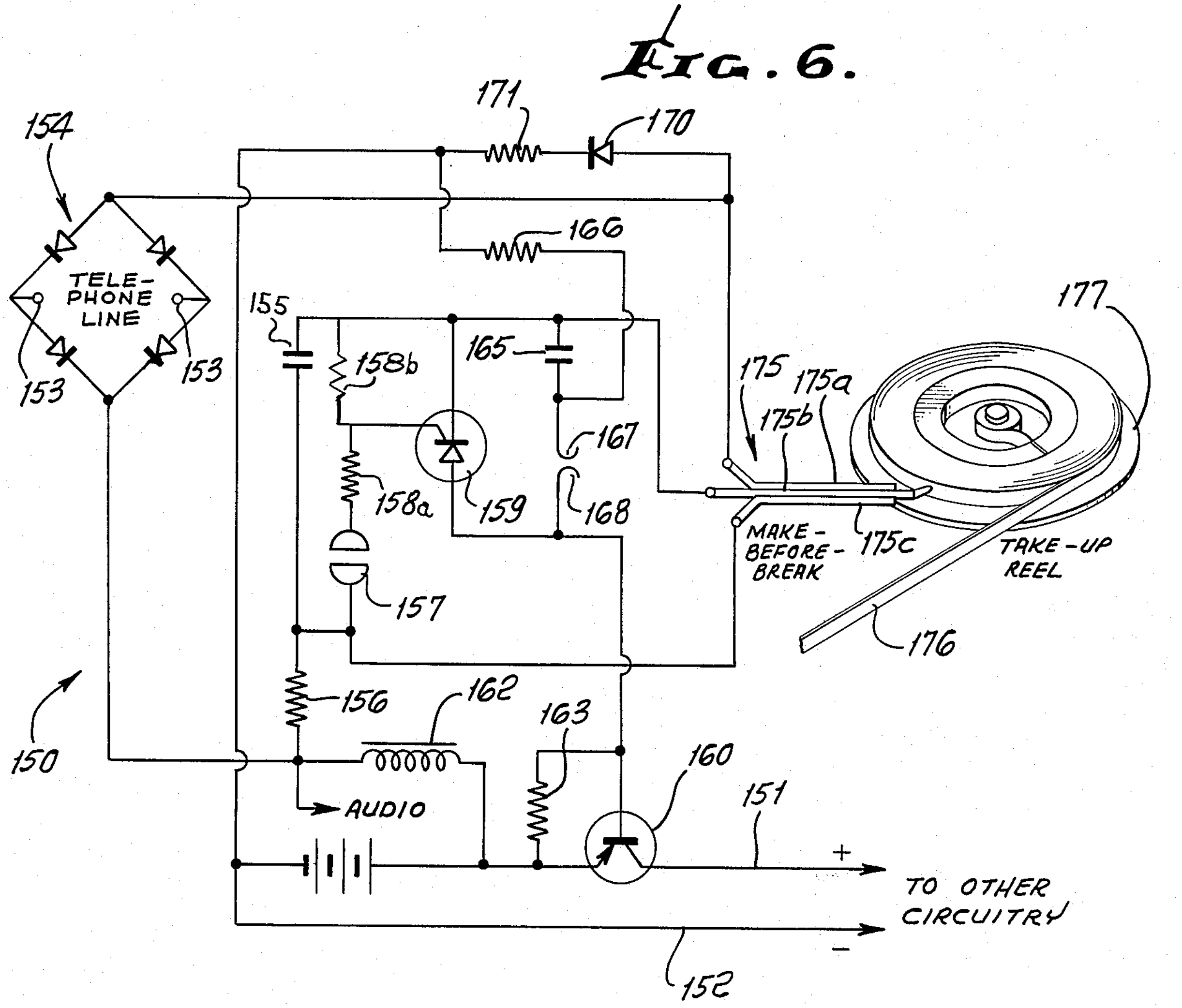
FIGS. 6 and 7 are electrical schematic diagrams of alternative fail-safe control circuits for telephone answering devices.
Figure 7:
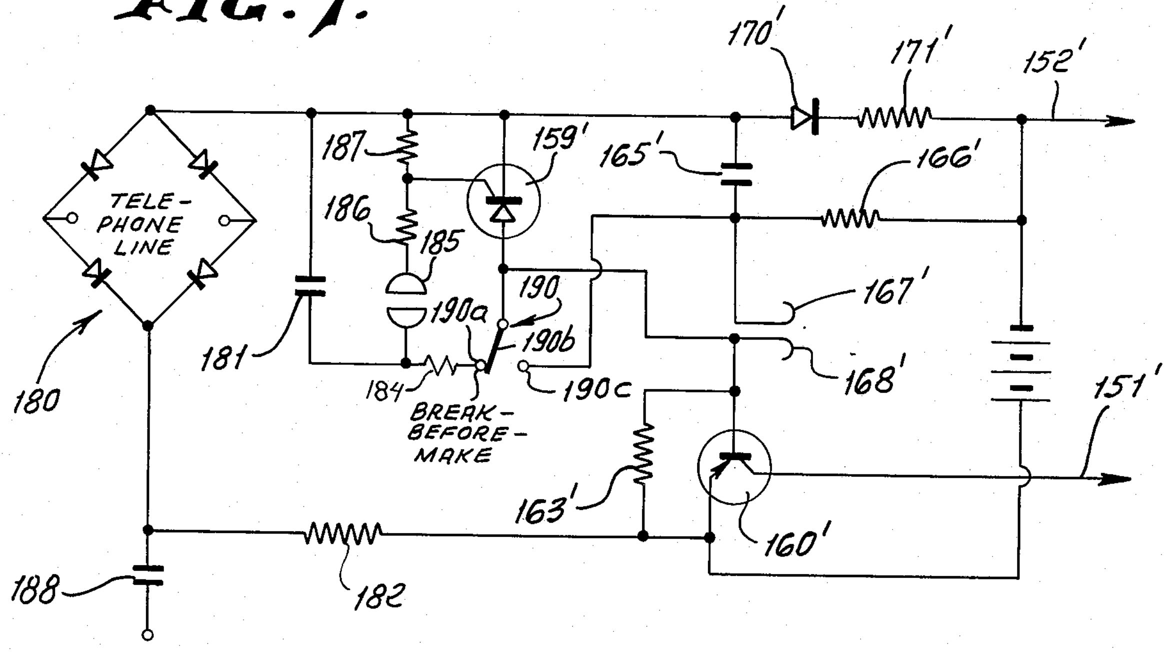

FIGS. 6 and 7 show alternative fail-safe circuits useful with an answering device control circuit of the type disclosed in the inventor's copending U.S. application, Ser. No. 254,924.

Referring to FIG. 6, the control circuit 150 provides power via the lines 151, 152 to an answering device motor and circuitry in response to a ringing signal on the telephone line connected to the terminals 153. Such a ringing signal, rectified by a bridge 154, causes a capacitor 155 to be charged via a resistor 156 to a level sufficient to fire a neon bulb 157. When this occurs, a trigger signal is applied via resistors 158*a*, 158*b* to the gate of a silicon controlled rectifier 159. The resultant conduction of the SCR 159 turns on a transistor 160 to connect power from a battery 161 to the lines 151, 152. Turn-on of the transistor 160 also effectively connects an inductor 162 across the telephone line to simulate the off-hook condition. A resistor 163 biases the transistor 160 off until the SCR 159 is triggered.

During the message answering cycle, a capacitor 165 is charged via a resistor 166. At the end of the cycle, a pair of contacts 167, 168 are shorted to discharge the capacitor 165 across the SCR 159, thereby turning the SCR 159 off and terminating the answering cycle. To prevent premature turn-off of the SCR 159 should the dc bias on the telephone line be interrupted during an answering cycle, a holding current is provided from the battery 161 via a diode 170 and a resistor 171.

The fail-safe circuit (FIG. 6) includes a make-before-break switch 175 operative in conjunction with the incoming message recording tape 176 received on a take-up reel 177. During normal operation the contacts 175*a* and 175*b* are closed and the contacts 175*b* and 175*c* are open.

As incoming messages are recorded, more and more tape 176 accumulates on the take-up reel 177. Eventually, if the tape 176 is not rewound, insufficient tape will remain on the supply reel (not shown) to record additional incoming messages. The switch 175 is positioned so that when this occurs, the switch contacts 175*b*, 175*c* will close, thereby shorting the capacitor 155. As a result, the SCR 159 will not be triggered upon occurrence of subsequent ringing signals, and no further calls will be answered. No messages will be lost, as would happen if a call were answered but there was insufficient tape to record it.

Should the incoming message timing means fail, the answering cycle would not terminate normally. The incoming message recording tape would continue to wind onto the take-up reel 177. The telephone line would remain off-hook, and eventually the battery 161 would run down. However, this is prevented by opening of the switch contacts 175a, 175b when substantially all of the incoming message tape accumulates on the take-up reel 177. Opening of the contacts 175a, 185b turns off the SCR 159 to terminate the answering cycle, and to prevent subsequent turn-on until the problem is corrected and the incoming message tape is rewound.

In the embodiment of FIG. 7, the ringing signal is rectified by a bridge 180 and used to charge a capacitor 181 via a telephone line load 182, a resistor 163' and a resistor 184. When the capacitor 181 is charged sufficiently, it will discharge across a neon bulb 185 and a pair of resistors 186, 187 to trigger on SCR 159'. This causes turn on of the transistor 160' to connect power from a battery 161' to other answering device circuitry via the lines 151', 152'. A resistor 163' provides bias to keep the transistor 160' off until occurrence of a telephone ringing signal. The function of the components 165' through 171' is identical to that of the unprimed but like numbered components in FIG. 6. Audio is coupled to the telephone line via a capacitor 188.

In the embodiment of FIG. 7, the fail-safe switch 190 is mounted similarly to the switch 175 of FIG. 6, but is of the "break-before-make" type. Thus normally the switch arm 190b touches the contact 190a but is open-circuited with respect to the contact 190c. When insufficient tape 176 remains to record additional incoming messages, the tape accumulated on the take-up reel 177 will move the switch arm 190b out of touch with the contact 190a. This will open the discharge path of the capacitor 181, and thereby prevent the SCR 159' from being turned on upon occurrence of a subsequent ringing signal.

In the instance tht the answering cycle does not terminate normally, and the recording tape continues to wind onto the take-up reel, the accumulated tape will eventually push the switch arm 190b against the 190c. This terminates the answering cycle by discharging the capacitor 165' across the SCR 159' to turn off that SCR.

As shown in FIG. 1, a second contact post 195 may be provided, containing a set of contacts which are shorted by the conductive strip 16 just before the strip 16 readies the contact post 19. During recording of a new outgoing announcement, shorting of the contacts on the post 195 may be used to enable an oscillator to record an end-of-announcement "beep" tone on the tape loop 11.

Intending to claim all novel, useful and unobvious features shown or described, the applicant makes the following claims:

1. In an automatic telephone answering device of the type including means for transmitting an announcement to a telephone line during an announcement transmit portion of an answering cycle and having a reel-to-reel tape mechanism on which incoming messages are recorded during a subsequent incoming message record portion of the answering cycle, the improvement comprising:

a rim driven, incoming message tape take-up reel, a number ring having numerals on its upper surface, there being a certain angular separation between said numerals, said number ring being directly gear driven from said take-up reel so as to advance by a fixed angular extent corresponding to said separation during each incoming message record portion of the answering cycle, so that the numeral aligned at some fixed reference point is indicative of the number of calls which have been answered since the incoming message tape last was rewound, said number ring having gear teeth at its periphery, a relatively small diameter first gear mounted for rotation in unison with said take-up reel, a second gear of relatively large diameter driven by said take-up reel-associated first gear, said second gear making one revolution for a certain fixed number of revolutions of said take-up reel, a termination-switch actuating member affixed to said second gear, a switch actuated by said actuating member once each revolution of said second gear, a circuit responsive to actuation of said switch for terminating the answering cycle, a smaller third gear mounted for rotation in unison with said second gear, said third gear driving the gear teeth at the periphery of said number ring, said first, second and third gears cooperating to advance said number ring continuously as tape is wound onto said take-up reel when incoming messages are recorded and to counter-rotate said number ring as tape is rewound from said take-up reel back to a supply reel, said device having a housing with a window situated so that only a limited number of said numerals on said number ring are visable through said window.

2. A telephone answering device according to claim 1 wherein said device includes;

a control circuit having a silicon controlled rectifier which is triggered on in response to occurrence of a telephone ringing signal, said control circuit connecting power to said apparatus in response to turn-on of said silicon controlled rectifier to begin the answering cycle, a capacitor charged during said answering cycle, and interconnection circuitry effectively connecting said capacitor across said silicon controlled rectifier via said switch actuation of said switch causing said capacitor to be discharged across said silicon controlled rectifier in appropriate polarity so as terminate conduction thereof, thereby ending the answering cycle.

3. A telephone answering device according to claim 1 further comprising:

a separate motor for rim driving said take-up reel, a flip-flop, and means for setting said flip-flop to a first state at the beginning of each answering cycle and for setting said flip-flop to another state upon completion of announcement transmission, and a circuit directly connecting said separate motor to said flip-flop so that power to said separate motor is supplied directly from said flip-flop when set to said other state.

4. For use in a telephone answering device to indicate that at least one call has been answered, a supply reel hub containing tape on which incoming messages are recorded by said device, a cover for said supply reel hub, said cover being mounted for limited rotation of less than 360° with respect to said supply reel hub, an indicator patch on an outer surface of said cover, said cover being frictionally rotated by said supply reel hub to a first orientation when said tape is rewound, said cover being frictionally rotated by said supply reel hub to a second orientation as tape is pulled from said supply reel hub during recording of the first incoming message, the presence of said patch at said second orientation indicating that at least one call has been answered since said tape last was rewound.

5. A telephone answering device according to claim 4 wherein said indicator patch comprises a colored area on the top surface of said cover, and whrein said device includes a housing having a transparent window situated so that said colored area is hidden by said housing when said cover is in said first orientation and is visible through said window when said cover is in said second orientation, said cover also preventing spillage of said tape during shipment of said device.

6. A control circuit for a telephone answering device comprising:

a silicon controlled rectifier and means for providing power to other components of said device and for loading the telephone line during conduction of said silicon controlled rectifier, means for triggering conduction of said silicon controlled rectifier upon occurrence of a telephone ringing signal, comprising;

a capacitor and a diode connected in series across said telephone line, a triggering capacitor series connected across said diode so as to be charged by a telephone ringing signal rectified by said diode, a pulse transformer, a neon bulb connecting said triggering capacitor to the primary of said transformer so that when the charge across said triggering capacitor reaches a level sufficient to ignite said bubl, said capacitor will discharged via said bulb across said transformer primary, the secondary of said transformer being operatively connected to trigger said silicon controlled rectifier when said triggering capacitor is discharged across said transformer primary.

7. A telephone answering device including a control circuit according to claim 6 together with:

a tape on which incoming messages are recorded, a take-up reel for said tape, means for rim-driving said incoming message tape take-up reel, aa cycle-termination switch, gear means for actuating said cycle-termination switch after said take-up reel has made a certain number of revolutions, and circuit means, interconnecting said cycle-termination switch and said control circuit, for causing said silicon controlled rectifier to stop conduction when said cycle-termination switch is actuated by said gear means.

8. A control circuit according to claim 6 wherein one terminal of said transformer secondary is connected to the cathode of said silicon controlled rectifier, means connecting the other terminal of said transformer secondary to the gate of said silicon controlled rectifier, and isolation means connected to said transformer secondary, to prevent the ringing of said transformer from turning on said silicon controlled rectifier after turn-off thereof.

9. A telephone answering device including a control circuit according to claim 8, and first and second separate motors for driving respectively an announcement transmit tape and an incoming message record tape during different portions of an answering cycle, said device further including:

a flip-flop connected to said control circuit so as to be set to a first state when said silicon controlled rectifier is triggered into conduction upon occurrence of a telephone ringing signal at the beginning of the answering cycle, and set to a second state after transmission to the telephone line of an announcement from said transmit tape, said flip-flop supplying power only to said first motor when in said first state and supplying power only to said second motor when in said second state.

10. A telephone answering device according to claim 9, wherein said flip-flop includes a first and second transistors which conduct respectively when said flip-flop is in said first and second states, said first and second motors being connected to a source of power via said first and second transistors respectively.

11. A telephone answering device according to claim 9, wherein said announcement transmit tape is a loop having an electrically conductive segment, together with a set of contacts which are shorted by said segment when said loop reaches a certain position, and means, operative during a telephone answering cycle, for causing said flip-flop to switch from said first to said second state when said contacts are shorted.

12. A telephone answering device according to claim 11, and having provision for recording a new announcement on said tape loop, including manual switch means for initiating conduction of said silicon controlled rectifier and means, operative during new announcement recording, for terminating conduction of said silicon controlled rectifier when said set of contacts is shorted by said segment.

13. In a telephone answering device of the type having a control circuit in which a silicon controlled rectifier (SCR) is triggered on in response to occurrence of a telephone ringing signal to start the answering cycle, and in which incoming messages are recorded on a tape which is received on a take-up reel, the improvement comprising:

a fail-safe switch mounted so as to be actuated when sufficient tape is accumulated on said take-up reel, said switch having a normal position assumed when there is still enough tape to record additional incoming messages, said switch being moved to a first position by the tape accumulated on said take-up reel when there is insufficient tape remaining to record additional incoming messages, said switch being moved to a second position when substantially all of the incoming message tape has been wound onto said take-up reel, and circuit means, operatively connected said fail-safe switch and said control circuit, for preventing turn-on of said SCR upon occurrence of a subsequent ringing signal when said fail-safe switch is in said first position and for turning off said SCR when said switch is moved to said second position.

14. A telephone answering device according to claim 13, wherein said fail-safe switch is of the single-pole, double-throw, make-before-break type, the contact arm of said switch being mounted for actuation by the tape accumulated on said take-up reel; wherein closing of the normally open contacts of said fail-safe switch shorts out the circuit used to trigger said SCR to prevent subsequent turn-on thereof; and wherein opening of the normally closed contacts of said fail-safe switch open circuits a line to said SCR to cause turn-off thereof.

15. A telephone answering device according to claim 13, wherein said fail-safe switch is of the single-pole, double-throw, break-before-make type, the contact arm of said switch being mounted for actuation by the tape accumulated on said take-up reel, and wherein opening of the normally closed contacts of said fail-safe switch disconnects the circuit used to trigger said SCR to prevent subsequent turn-on thereof, and wherein closing of the normally open contacts of said fail-safe switch causes a capacitor in said circuit means to be discharged across said SCR to cause turn-off thereof.

16. A telephone answering device according to claim 13, wherein said fail-safe switch is of the single-pole, double-throw type and includes a central switch arm which is actuated by tape accumulated on said take-up reel, said central switch arm being in a circuit common to both trigger-inhibit and turn-off of said SCR.

17. Means for preventing tape spillage during transit of a telephone answering device or like apparatus having a reel-to-reel tape recording mechanism, comprising;

a supply reel hub containing a supply of recording tape wound thereon, a cover for said supply reel hub, said cover having a planar disc-shaped top and a flange depending downwardly from the periphery of said top to provide a retaining sidewall that prevents tape spillage, said flange sidewall incompletely encircling said tape reel, there being an opening in said flange sidewall of sufficient angular extent to permit egress of said tape regardless of the diameter of the tape supply remaining on said hub.

18. Means according to claim 17, wherein said cover is rotatably mounted to the shaft of said supply reel hub, said cover further having at least one tab extending therefrom and cooperating with a restraining post affixed to said apparatus to permit limited rotational motion of said cover, said cover being frictionally rotated by said hub and tape so that the angular position of said cover will indicate whether any tape has been unwound from said supply reel.

* * * * *